US012574717B2

(12) United States Patent
Gundavelli et al.

(10) Patent No.: US 12,574,717 B2
(45) Date of Patent: \*Mar. 10, 2026

(54) FACILITATING VISITED NETWORK SELECTION BY A USER EQUIPMENT BASED ON SLICE CONSIDERATIONS

(71) Applicant: Cisco Technology, Inc., San Jose, CA (US)

(72) Inventors: Srinath Gundavelli, San Jose, CA (US); Vimal Srivastava, Bangalore (IN)

(73) Assignee: CISCO TECHNOLOGY, INC., San Jose, CA (US)

( \* ) Notice: Subject to any disclaimer, the term of this patent is extended or adjusted under 35 U.S.C. 154(b) by 212 days.

This patent is subject to a terminal disclaimer.

(21) Appl. No.: 18/449,108

(22) Filed: Aug. 14, 2023

(65) Prior Publication Data

US 2023/0388773 A1 Nov. 30, 2023

Related U.S. Application Data

(63) Continuation of application No. 17/403,414, filed on Aug. 16, 2021, now Pat. No. 11,792,634.

(51) Int. Cl.
| | |
|---|---|
| *H04W 76/10* | (2018.01) |
| *H04W 8/06* | (2009.01) |
| *H04W 60/06* | (2009.01) |

(52) U.S. Cl.
CPC .............. *H04W 8/06* (2013.01); *H04W 60/06* (2013.01); *H04W 76/10* (2018.02)

(58) Field of Classification Search
CPC .................................. H04W 8/06; H04W 76/10
See application file for complete search history.

(56) References Cited

U.S. PATENT DOCUMENTS

| | | | |
|---|---|---|---|
| 10,779,230 B1 * | 9/2020 | Sethi | H04W 60/04 |
| 10,893,405 B2 | 1/2021 | Zee et al. | |

(Continued)

FOREIGN PATENT DOCUMENTS

CN 110225563 B 11/2020

OTHER PUBLICATIONS

3GPP: "3rd Generation Partnership Project; Technical Specification Group Core Network and Terminals; 5G System; Gateway Mobile Location Services; Stage 3 (Release 17)," 3GPP TS 29.515 V17.1.0, Jun. 2021, 50 Pages.

(Continued)

*Primary Examiner* — Michael T Vu
(74) *Attorney, Agent, or Firm* — Edell, Shapiro & Finnan, LLC

(57) ABSTRACT

Presented herein are techniques to facilitate visited network selection by a user equipment (UE) based on slice considerations. In one example, a method may include requesting, by a UE that is roaming among a plurality of visited mobile networks, registration for a network connection associated with a slice type; obtaining, by the UE from home mobile network for the UE, a priority for each of the plurality of visited mobile networks and an indication of one or more slice types provided by each of the plurality of visited mobile networks; selecting, by the UE, a highest priority visited mobile network of the plurality of visited mobile networks that provides the slice type; and establishing, by the UE, the network connection with the highest priority visited mobile network of the plurality of visited mobile networks that provides the slice type.

20 Claims, 8 Drawing Sheets

Home

Roaming

(56) References Cited

U.S. PATENT DOCUMENTS

| | | | |
|---|---|---|---|
| 12,250,557 B2 * | 3/2025 | Nooren | H04W 16/04 |
| 2019/0261185 A1 * | 8/2019 | Velev | H04W 48/18 |
| 2020/0029201 A1 | 1/2020 | Casati | |
| 2020/0137552 A1 | 4/2020 | Park et al. | |
| 2020/0177333 A1 | 6/2020 | Liu | |
| 2020/0267638 A1 | 8/2020 | Ni et al. | |
| 2020/0314740 A1 | 10/2020 | Lee et al. | |
| 2021/0297940 A1 | 9/2021 | Prakasam et al. | |
| 2022/0070649 A1 | 3/2022 | Sahin et al. | |
| 2023/0107525 A1 | 4/2023 | Gupta et al. | |
| 2023/0388775 A1 | 11/2023 | Prakasam et al. | |
| 2024/0414619 A1 | 12/2024 | Long | |

OTHER PUBLICATIONS

3GPP: "3rd Generation Partnership Project; Technical Specification Group Core Network and Terminals; 5G System; Steering of Roaming Application Function Services; Stage 3 (Release 17)," 3GPP TS 29.550 V17.1.0, Jun. 2021, 21 Pages.

3GPP: "3rd Generation Partnership Project; Technical Specification Group Core Network and Terminals; Non-Access-Stratum (NAS) Functions Related to Mobile Station (MS) in Idle Mode (Release 17)," 3GPP TS 23.122 V17.3.0, Jun. 2021, 102 Pages.

3GPP: "3rd Generation Partnership Project; Technical Specification Group Core Network and Terminals; Non-Access-Stratum (NAS) protocol for 5G System (5GS); Stage 3; (Release 17)," 3GPP TS 24.501 V17.3.1, Jun. 2021, 825 Pages.

3GPP, "3rd Generation Partnership Project; Technical Specification Group Services and System Aspects; Policy and Charging Control Framework For The 5G System (5GS); Stage 2 (Release 17)," 3GPP TS 23.503 V17.1.0, Jun. 2021, 137 Pages.

3GPP: "3rd Generation Partnership Project; Technical Specification Group Services and System Aspects; Procedures for the 5G System (5GS); Stage 2 (Release 17)," 3GPP TS 23.502 V17.1.0, Jun. 2021, 692 Pages.

3GPP: "3rd Generation Partnership Project; Technical Specification Group Services and System Aspects; Service Accessibility (Release 17)," 3GPP TS 22.011 V17.3.0, Dec. 2020, 34 Pages.

3GPP: "3rd Generation Partnership Project; Technical Specification Group Services and System Aspects; Study on Enhanced Access to and Support of Network Slice (Release 18)," 3GPP TR 22.835 V18.1.0, Jun. 2021, 38 Pages.

3GPP: "3rd Generation Partnership Project; Technical Specification Group Services and System Aspects; System Architecture for the 5G System (5GS); Stage 2 (Release 17)," 3GPP TS 23.501 V17.1.1, Technical Specification, Jun. 2021, 526 Pages.

ETSI: "Digital Cellular Telecommunications System (Phase 2+) (GSM); Universal Mobile Telecommunications System UMTS); LTE; 5G; Non-Access-Stratum (NAS) Functions Related to Mobile Station (MS) in Idle Mode (3GPP TS 23.122 version 16.8.0 Release 16)," ETSI TS 123 122 V16.8.0, Jan. 2021, 85 Pages.

ETSI: "Digital Cellular Telecommunications System (Phase 2+) (GSM); Universal Mobile Telecommunications System (UMTS); LTE; Service Accessibility," ETSI TS 122 011 V16.5.0, Nov. 2020, 35 Pages.

GSM Association: "Steering of Roaming Implementation Guidelines," Official Document IR.73, Version 5.0, May 4, 2020, 34 Pages.

Tech-Invite: "Steering Of UE In VPLMN During Registration," TS 23.122, 10 Pages, [Retrieved on Apr. 28, 2021] Retrieved from URL: https://www.tech-invite.com/3m23/toc/tinv-3gpp-23-122_I.html#top.

* cited by examiner

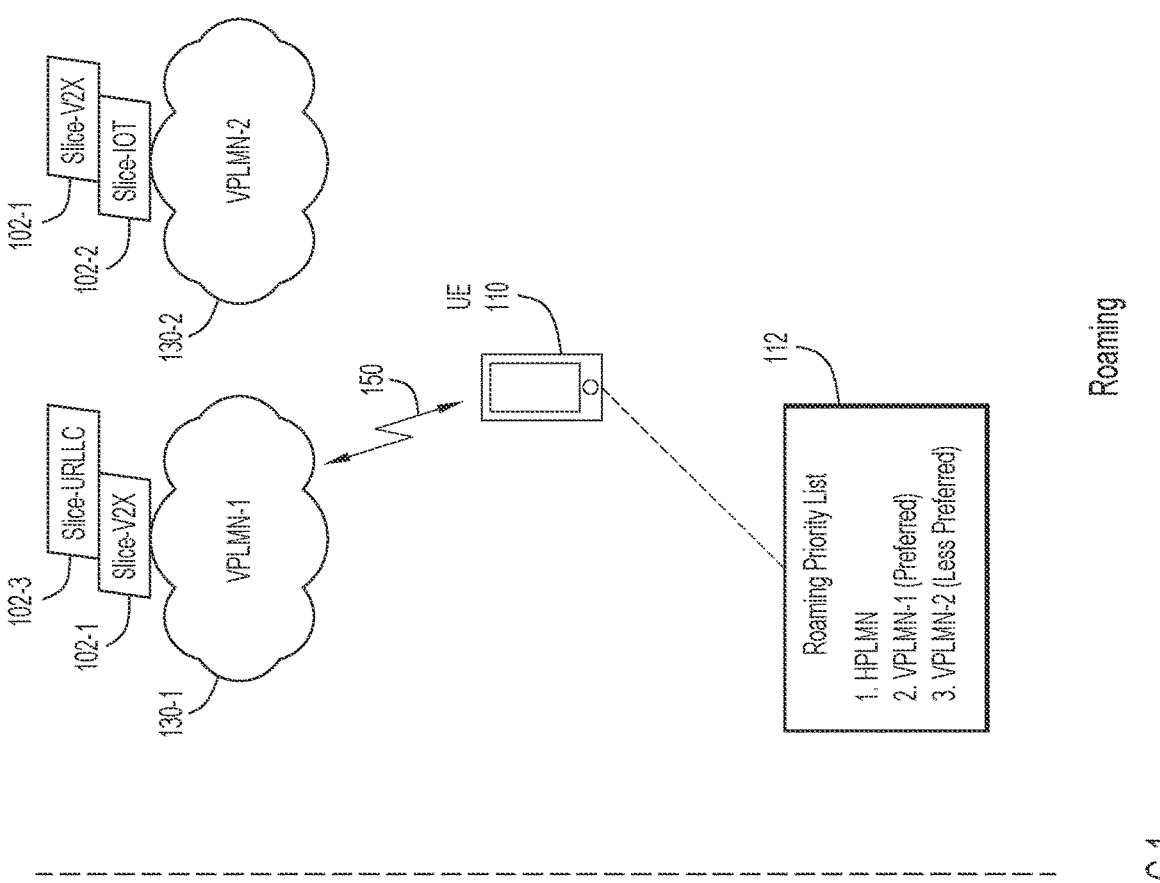
Roaming
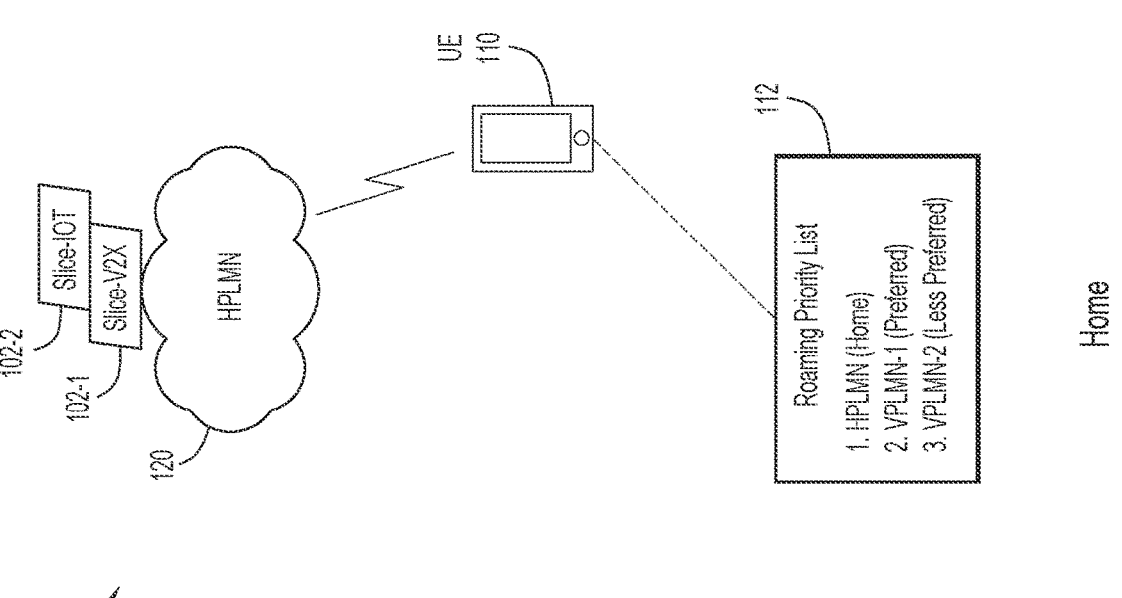
Home
FIG.1

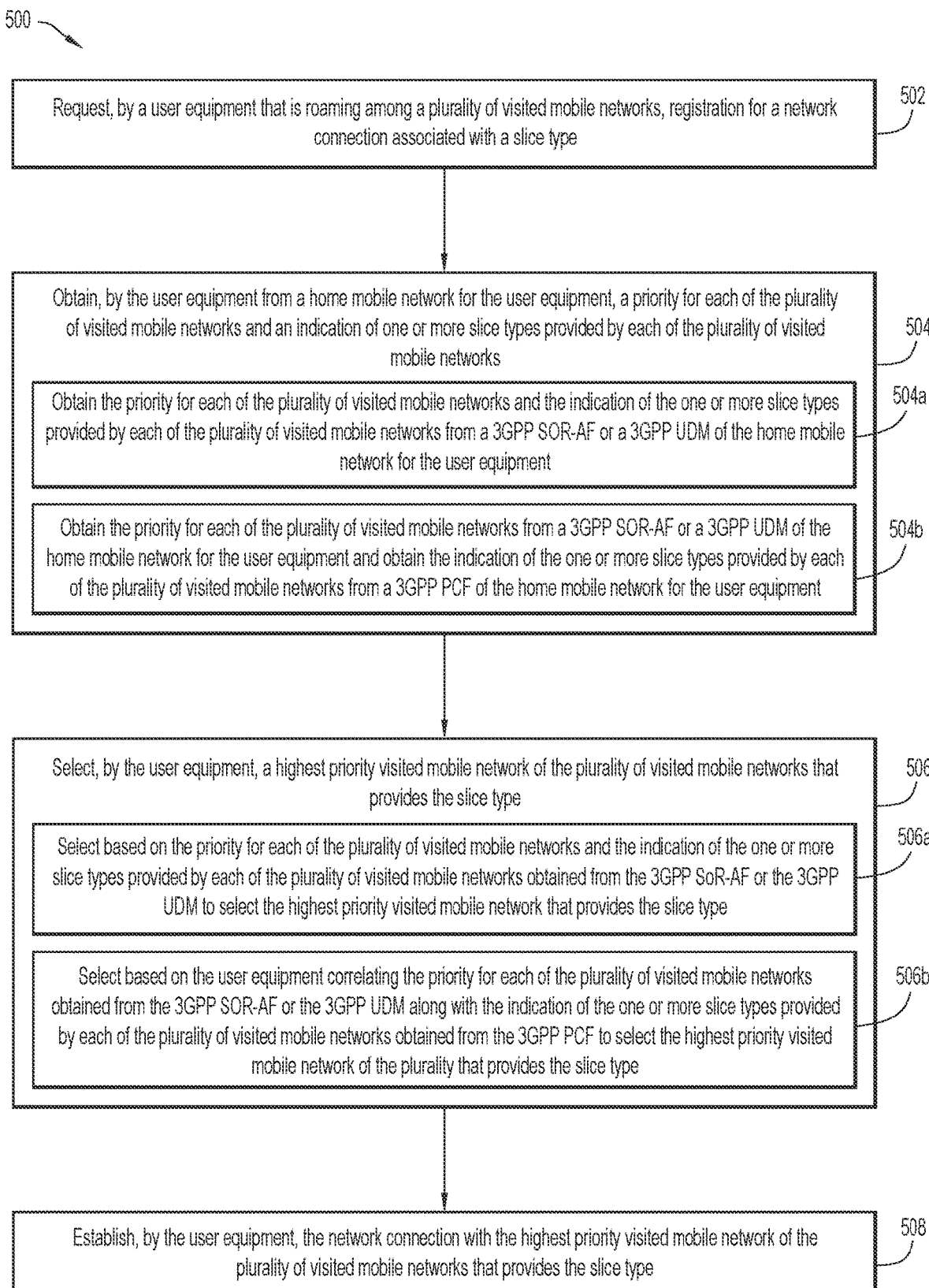

500

502 Request, by a user equipment that is roaming among a plurality of visited mobile networks, registration for a network connection associated with a slice type 504 Obtain, by the user equipment from a home mobile network for the user equipment, a priority for each of the plurality of visited mobile networks and an indication of one or more slice types provided by each of the plurality of visited mobile networks 504a Obtain the priority for each of the plurality of visited mobile networks and the indication of the one or more slice types provided by each of the plurality of visited mobile networks from a 3GPP SOR-AF or a 3GPP UDM of the home mobile network for the user equipment 504b Obtain the priority for each of the plurality of visited mobile networks from a 3GPP SOR-AF or a 3GPP UDM of the home mobile network for the user equipment and obtain the indication of the one or more slice types provided by each of the plurality of visited mobile networks from a 3GPP PCF of the home mobile network for the user equipment 506 Select, by the user equipment, a highest priority visited mobile network of the plurality of visited mobile networks that provides the slice type 506a Select based on the priority for each of the plurality of visited mobile networks and the indication of the one or more slice types provided by each of the plurality of visited mobile networks obtained from the 3GPP SoR-AF or the 3GPP UDM to select the highest priority visited mobile network that provides the slice type 506b Select based on the user equipment correlating the priority for each of the plurality of visited mobile networks obtained from the 3GPP SOR-AF or the 3GPP UDM along with the indication of the one or more slice types provided by each of the plurality of visited mobile networks obtained from the 3GPP PCF to select the highest priority visited mobile network of the plurality that provides the slice type 508 Establish, by the user equipment, the network connection with the highest priority visited mobile network of the plurality of visited mobile networks that provides the slice type

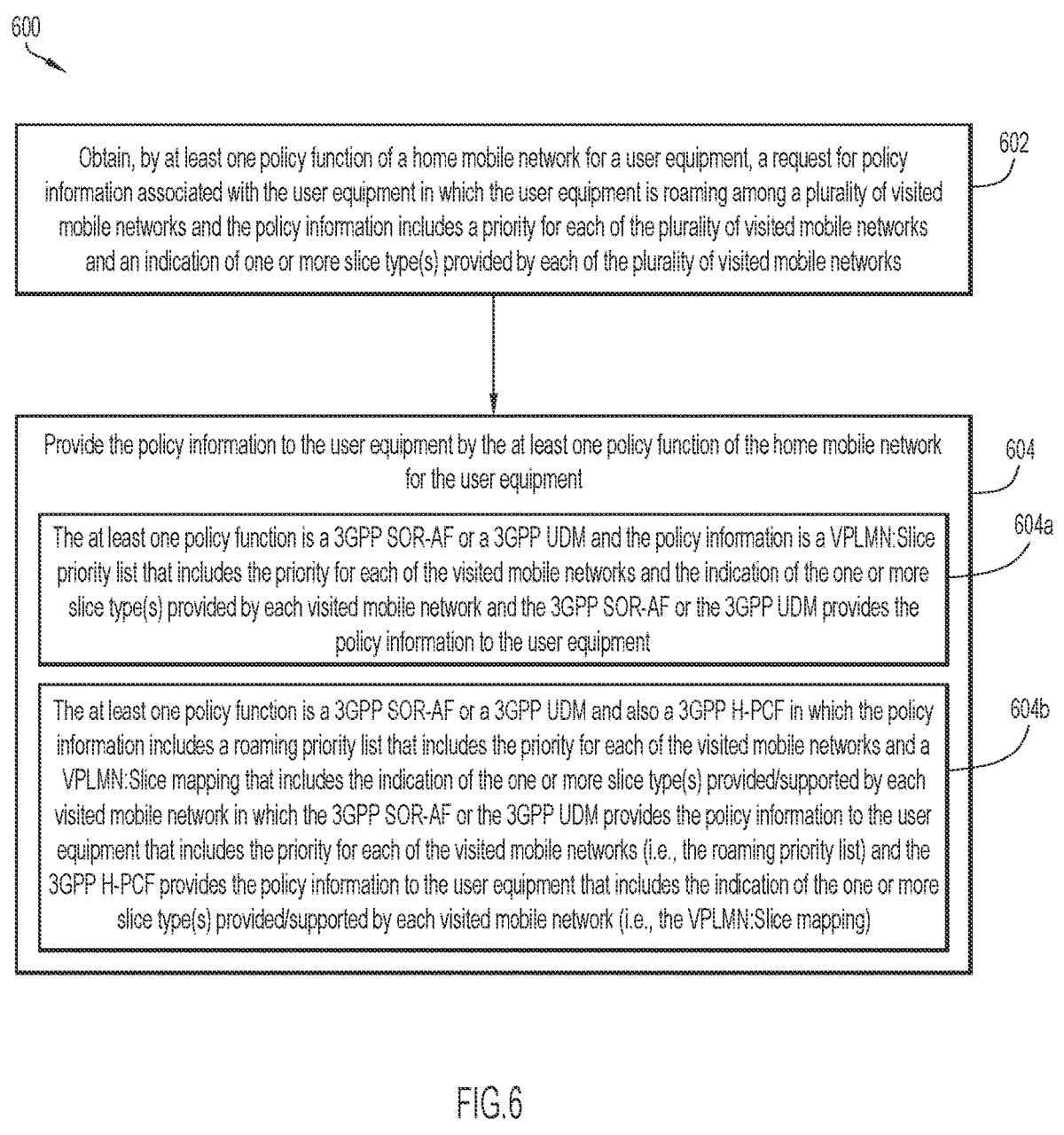

| 602 |

Obtain, by at least one policy function of a home mobile network for a user equipment, a request for policy information associated with the user equipment in which the user equipment is roaming among a plurality of visited mobile networks and the policy information includes a priority for each of the plurality of visited mobile networks and an indication of one or more slice type(s) provided by each of the plurality of visited mobile networks

604

Provide the policy information to the user equipment by the at least one policy function of the home mobile network for the user equipment 604a The at least one policy function is a 3GPP SOR-AF or a 3GPP UDM and the policy information is a VPLMN:Slice priority list that includes the priority for each of the visited mobile networks and the indication of the one or more slice type(s) provided by each visited mobile network and the 3GPP SOR-AF or the 3GPP UDM provides the policy information to the user equipment 604b The at least one policy function is a 3GPP SOR-AF or a 3GPP UDM and also a 3GPP H-PCF in which the policy information includes a roaming priority list that includes the priority for each of the visited mobile networks and a VPLMN:Slice mapping that includes the indication of the one or more slice type(s) provided/supported by each visited mobile network in which the 3GPP SOR-AF or the 3GPP UDM provides the policy information to the user equipment that includes the priority for each of the visited mobile networks (i.e., the roaming priority list) and the 3GPP H-PCF provides the policy information to the user equipment that includes the indication of the one or more slice type(s) provided/supported by each visited mobile network (i.e., the VPLMN:Slice mapping)

FIG.6

COMPUTING DEVICE

CONTROL LOGIC 720

I/O 714

I/O

I/O 712

NETWORK PROCESSOR UNIT(s) 710

708

STORAGE 706

MEMORY ELEMENT(s) 704

PROCESSOR(s) 702

700

FACILITATING VISITED NETWORK SELECTION BY A USER EQUIPMENT BASED ON SLICE CONSIDERATIONS

PRIORITY CLAIM

This application is a continuation of and claims the benefit of priority to U.S. patent application Ser. No. 17/403,414, filed Aug. 16, 2021, now U.S. Pat. No. 11,792,634, the entire contents of which are incorporated herein by reference.

TECHNICAL FIELD

The present disclosure relates to network equipment and services.

BACKGROUND

Networking architectures have grown increasingly complex in communications environments, particularly mobile networking environments. In some cases, a user equipment may roam in visited networks provided by different roaming partners. When roaming in a visited network, a home network provider for the user equipment can provide roaming information including a list of roaming partners to which the user equipment can connect. In some instances, the user equipment may desire to attach to a particular network slice in order to access services provided by the slice. However, the user equipment does not have prior knowledge regarding which slices are supported by which roaming partners; thus, there are challenges to facilitate visited network selection by the user equipment.

BRIEF DESCRIPTION OF THE DRAWINGS

FIG. 1 is a block diagram illustrating example challenges that can be encountered by a user equipment when roaming in visited networks.

FIG. 5 is a flow chart depicting a method according to an example embodiment.

FIG. 6 is another flow chart depicting a method according to an example embodiment.

DESCRIPTION OF EXAMPLE EMBODIMENTS

Overview

Figure 2:
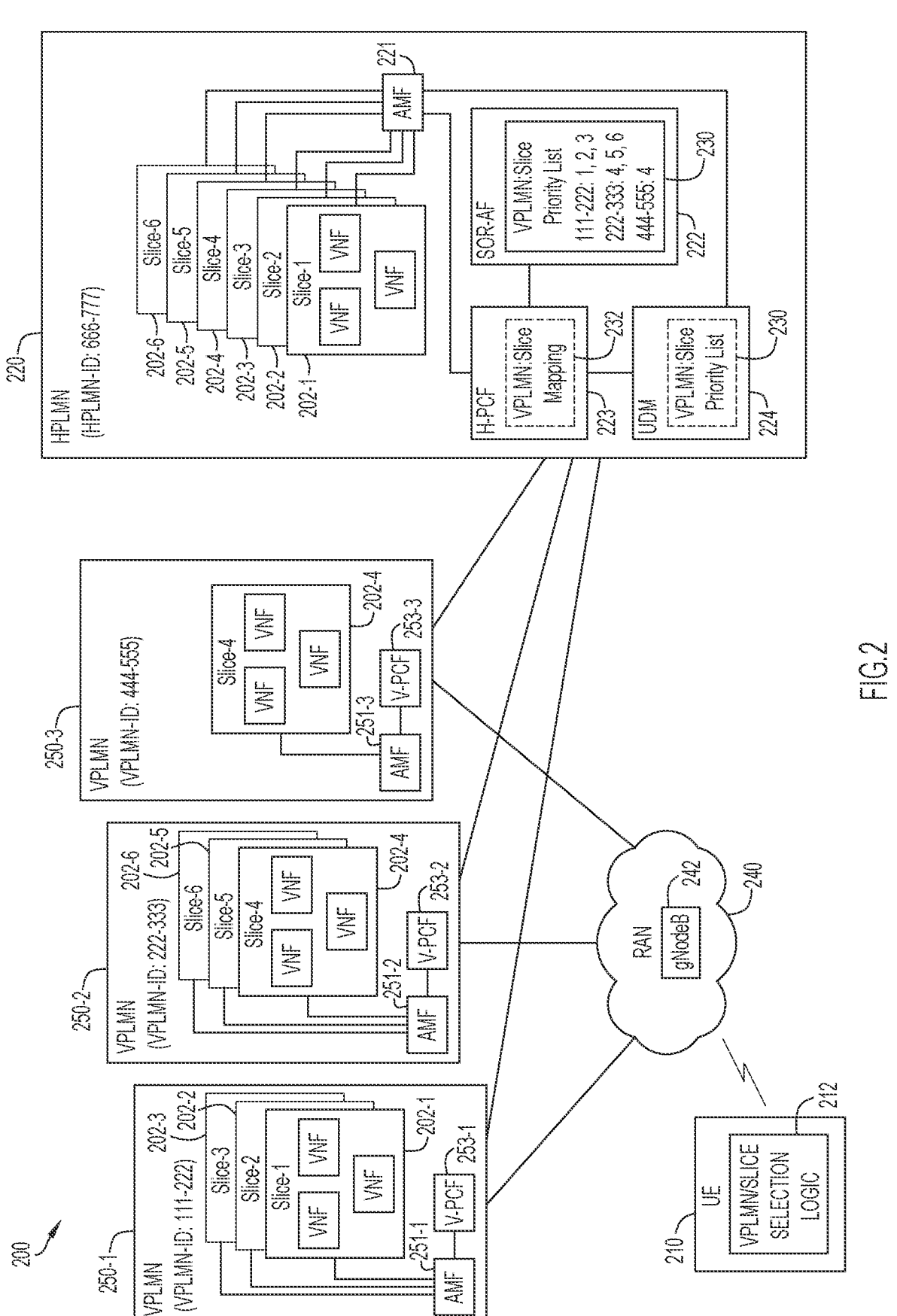
FIG. 2 is a block diagram of a system in which techniques may be implemented to facilitate visited network selection by a user equipment based on slice considerations, according to an example embodiment.

Presented herein are techniques to facilitate visited network selection by a user equipment based on slice considerations provided to the user equipment from a home network. In particular, techniques herein may provide a user equipment to efficiently latch on to/connect with preferred Visited Public Land Mobile Network (VPLMN) based service/network slice considerations rather than connecting to a most preferred VPLMN that may not support a service/network slice requested by the user equipment.

In one embodiment, a method is provided that may include requesting, by a user equipment (UE) that is roaming among a plurality of visited mobile networks, registration for a network connection associated with a slice type; obtaining, by the UE, a priority for each of the plurality of visited mobile networks and an indication of one or more slice types provided by each of the plurality of visited mobile networks; selecting, by the UE, a highest priority visited mobile network of the plurality of visited mobile networks that provides the slice type; and establishing, by the UE, the network connection with the highest priority visited mobile network of the plurality of visited mobile networks that provides the slice type.

Example Embodiments

Presented herein are various techniques that may facilitate visited network selection by a user equipment (UE) based on slice considerations. Generally, a network slice also referred to generally as a 'slice' or can refer to a group or set of Virtualized Network Functions (VNFs) that are configured to facilitate a certain mobile network service or group of mobile network services.

Different types of slices (slice types) can be configured for a mobile network such that each slice type can provide certain mobile network services. As referred to herein and in the claims, the terms 'slice' and 'slice instance' may be used interchangeably to refer to a slice type that is instantiated (e.g., configured, created, operated, etc.) to provide one or more mobile network services for one or more user equipment. Various VNFs that can be configured for a slice type in accordance with techniques described herein can include Third Generation Partnership Project (3GPP) Fourth Generation/Long Term Evolution (4G/LTE) VNFs and/or Fifth Generation (5G) VNFs, as may be prescribed, at least in part, by 3GPP standards.

To provide mobile network services associated with a given slice type, a slice of the given slice type can be instantiated in which the instantiated slice for the slice type can provide certain mobile network services to a number of UEs. Various example slice types can include, but not be limited to, a cellular vehicle to everything (V2X) slice type that can provide cellular V2X services, an Internet of Things (IoT or IOT) massive IoT (mIoT) slice type that can provide IoT related services, an Ultra-Reliable Low-Latency Communication (URLLC) slice type that can provide URLLC services, an enhanced Mobile Broadband (eMBB) slice type that can provide mobile broadband services, a massive Machine-Type Communication (mMTC) slice type that can provide MTC services, a High Performance Machine-Type Communication (HMTC) slice type that can provide HMTC services, etc. Other slice types can be envisioned.

Per-3GPP Technical Specification (TS) 23.501, Section 5.15.2, Single-Network Slice Selection Assistance Information (S-NSSAI) can be used to uniquely identify a slice in which an S-NSSAI includes a Slice/Service Type (SST), which indicates the expected slice behavior for a slice requested by a UE in terms of expected features and services, and a Slice Differentiator (SD), which is optional and can be used to differentiate among multiple slices of a same SST (e.g., a slice instance identifier or the like for a given slice type).

For various examples herein, a slice type requested by a UE can be referenced generally as a number or value (e.g., slice 1, slice 2, etc.), however, it is to be understood that a slice requested by the UE can correspond to an SST value and, optionally, an SD, in accordance with 3GPP specifications. For example, per-3GPP TS 23.501, Section 5.15.2.2, standardized SST values include an SST value of '1' that can be used to identify an eMBB slice type, an SST value of '2' can be used to identify a URLLC slice type, an SST value of '3' can be used to identify an MIoT slice type, an SST value of '4' can be used to identify a V2X slice type, and an SST value of '5' can be used to identify an HMTC slice type.

It is to be understood that additional SST values may be configured by a mobile network operator for other slice types. Additionally, slice type values used for various examples/embodiments described herein may differ from the standardized SST values provided by 3GPP specifications. However, it is to be understood that the slice type values discussed for examples/embodiments herein are provided for illustrative purposes only in order to illustrate various features of the techniques described herein and are not meant to limit the broad scope of the present disclosure.

Referring to FIG. 1, FIG. 1 is a block diagram of a system 100 illustrating example challenges that can be encountered by a user equipment when roaming in visited networks. FIG. 1 includes a user equipment (UE) 110 in which the UE is illustrated under different connection scenarios. For example, a first scenario is shown in which the UE 110 is considered to be connected to a Home Public Land Mobile Network (HPLMN) 120 that provides/supports a first slice type 102-1, which may provide V2X services (Slice-V2X, as shown in FIG. 1), and a second slice type 102-2, which may provide IoT services (Slice-IOT, as shown in FIG. 1).

A second scenario is also shown which the UE 110 is considered to be seeking connection to a Visited Public Land Mobile Network (VPLMN) when two VPLMNs are present at the location of the UE, such as a first VPLMN (VPLMN-1) 130-1 and a second VPLMN (VPLMN-2) 130-2 in which each VPLMN may provide/support different slice types. For example, VPLMN-1 130-1 may provide the first slice type 102-1 (Slice-V2X) that provides V2X services and may also provide a third slice type 102-3, which may provide URLLC services (Slice-URLLC, as shown in FIG. 1). Further, VPLMN-2 130-2 may provide the first slice type 102-1 (Slice-V2X) and the second slice type 102-2 (Slice-IOT).

Generally, an HPLMN can be referred to herein as a 'home network' and a VPLMN can be referred to herein as a 'visited network'.

Each of VPLMN-1 130-1 and VPLMN-2 130-2 may be considered roaming partners of the HPLMN 120, such that when UE 110 is roaming outside of the HPLMN 120 (e.g., not able to connect to the HPLMN 120), mobile network service can be provide for the UE 110 via VPLMN-1 130-1 and/or VPLMN-2 130-2 based on a roaming agreement between the HPLMN 120 and each of VPLMN-1 130-1 and VPLMN-2 130-2 that affords UE 110 mobile network service when roaming among the VPLMNs.

Consider for the first scenario that the UE 110, which in the HPLMN 120 is subscribed to the first slice type 102-1 (Slice-V2X) and the second slice type 102-2 (Slice-JOT).

Further, consider for the second scenario, while roaming among the first visited network/roaming partner VPLMN-1 130-1 and the second visited network/roaming partner VPLMN-2 130-1, that UE 110 is attempting to attach to the second slice type 102-2 (Slice-IoT), which is available/supported only by the second visited network/roaming partner, VPLMN-2 130-2.

Per-current 3GPP standards, when a UE, such as UE 110, is roaming in a visited network, the HPLMN 120 provides UE 110 with the Steering of Roaming (SOR) information. The UE will generate a roaming priority list 112 based on the SOR trigger from the home PLMN. The SOR information includes a prioritized list of roaming partners (VPLMNs) that the UE 110 can access when away from the home network. The ordering of the roaming priority list 112 is typically based on monetary cost of roaming service, Service Level Agreements (SLAs), and/or roaming agreements between the HPLMN 120 and VPLMNs/roaming partners, such as VPLMN-1 130-1 and VPLMN-2 130-2. For example, roaming priority list 112 may identify HPLMN 120 as the home mobile network for UE 110, may identify VPLMN-1 130-1 as the highest priority (e.g., most preferred) visited network, and may identify VPLMN-2 130-2 as the next highest priority (e.g., less preferred) visited network.

However, per-current 3GPP standards, UE 110 does not have prior knowledge of the slices/S-NSSAI(s) supported by the different roaming partners the roaming priority list as provided per 3GPP standards does not include S-NSSAI information, rather the list only includes the ordered list of roaming partners. There are scenarios where the most preferred roaming partner does not support the S-NSSAI from which the UE 110 may seek services, but the UE 110 still ends up latching on to the most preferred roaming partner based on the current roaming priority list 112.

For example, as shown the second scenario of FIG. 1 at 150, UE 110 may first attempt to connect to VPLMN-1 130-1 and request service for the second slice type 102-2 (Slice-JOT), since VPLMN-1 130-1 is the most preferred visited network identified in the roaming priority list 112.

However, as shown in FIG. 1, VPLMN-1 130-1 does not support the second slice type 102-2 (Slice IOT). Thus, on detecting the non-availability of the network slice for which UE 110 is seeking the IoT services, the UE 110 will move on to the next roaming partner from the list and the sequence will be repeated (e.g., with VPLMN-2 130-2, as identified in the roaming priority list 112). Such behavior can result in the UE 110 repeatedly performing Register/Unregister operations on different V-PLMNs based on the current roaming priority list 112, which can be inefficient and time-consuming as the UE 110 cycles through each of multiple visited networks until it finds a network that supports its requested slice.

Currently, there is no 3GPP standards-based mechanisms for a UE to have awareness of network slices supported on different VPLMN's. Further, there are also no standards-based semantics available at a UE to facilitate visited network selection based on the network slice from which the UE is seeking services based on the current standards-based roaming priority list.

Presented herein are two techniques to facilitate UE awareness regarding supported network slices for different roaming partners in order to enable considerations by a UE for selecting a visited network to which to connect when roaming among multiple visited networks.

Referring to FIG. 2, FIG. 2 is a block diagram of a system 200 in which techniques may be implemented to facilitate visited network selection by a UE based on slice considerations, according to an example embodiment.

As shown in FIG. 2, system 200 may include a UE 210, which may be configured with VPLMN/Slice selection logic 212 to facilitate operations in accordance with embodiments herein. Also shown in FIG. 2 are an HPLMN 220, a Radio Access Network (RAN) 240, and a number of VPLMNs, including a VPLMN 250-1, a VPLMN 250-2, and a VPLMN 250-3. HPLMN 220 may be referred to herein interchangeably as home network 220, which may be operated by a home network operator. The VPLMN 250-1 may be referred to herein interchangeably as visited network 250-1, which may be operated by a visited network operator, the VPLMN 250-2 may be referred to herein interchangeably as visited network 250-2, which may be operated by another visited network operator, and the VPLMN 250-3 may be referred to herein interchangeably as visited network 250-3, which may be operated by yet another visited network operator. For the embodiment of FIG. 2, it is assumed that each of visited network 250-1, 250-2, and 250-3 are roaming partners of home network 220, such that UE 210 is allowed to connect to any of the visited networks 250-1, 250-2, or 250-3 operated by the roaming partners when UE 210 is roaming outside the coverage area of home network 220.

A PLMN can be identified via a PLMN Identity (PLMN-ID) using a globally unique 3-digit Mobile Country Code (MCC) followed by a 2- or 3-digit Mobile Network Code, as follows: PLMN-ID: 'XXX-YYY' in which 'XXX' is the MCC and 'YYY' is the MNC. As shown in the embodiment of FIG. 2, consider that VPLMN 250-1 is identified using the MCC-MNC, '111-222' (e.g., VPLMN-ID: 111-222 for VPLMN 250-1), that VPLMN 250-2 is identified using the MCC-MNC, '222-333' (e.g., VPLMN-ID: 222-333 for VPLMN 250-2), and VPLMN 250-3 is identified using the MCC-MNC, '444-555' (e.g., VPLMN-ID: 444-555 for VPLMN 250-3).

In at least one embodiment, HPLMN 220 may be representative of a 5G mobile core network and may include an Access and Mobility Management Function 221, a Steering of Roaming Application Function (SOR-AF) 222, a Policy Control Function (PCF) that is referred to herein as Home-PCF (H-PCF) 223, and a Unified Data Management (UDM) entity 224. In some instances, UDM may interface with or include a Unified Data Repository (UDR), not shown in FIG. 2. HPLMN 220 may also provide a number of network slices to support services of a number of slice types to which UE 210 may be subscribed. For example, HPLMN 220 may provide a first slice type Slice-1 202-1, a second slice type Slice-2 202-2, a third slice type Slice-3 202-3, a fourth slice type Slice-4 202-4, a fifth slice type Slice-5 202-5, and a sixth slice type Slice-6 202-6 in which each slice type may include a number of VNFs configured to provide services associated with each slice type (e.g., VNFs to provide URLLC service, V2X services, etc.). Consider, in one instance, that HPLMN 220 is identified using the MCC-MNC '666-777' (e.g., HPLMN-ID: 666-777 for HPLMN 220).

In various embodiments, VNFs for each slice type 202-1, 202-2, 202-3, 202-4, 202-5, and 202-6 can include any combination of 3GPP 5G and/or next Generation (nG) mobile network functions, such as at least one Session Management Function (SMF), at least one User Plane Function (UPF), one or more policy function(s), one or more database(s), one or more slice management function(s), combinations thereof, and/or the like as may be prescribed by 3GPP standards for various mobile network services provided by each slice type.

For HPLMN 220, the AMF 221 may interface with each slice type 202-1, 202-2, 202-3, 202-4, 202-5, and 202-6, the H-PCF 223 and the UDM 224. H-PCF 223 and UDM 224 may further interface with SOR-AF 222. HPLMN 220 (e.g., network elements of HPLMN 220, such as AMF 221, H-PCF 223, and UDM 224) may interface with each VPLMN 250-1, 250-2, and 250-3 (e.g., network elements of each VPLMN). In some instances, the HPLMN 220 may interface with each VPLMN 250-1, 250-2, 250-3 over one or more data networks, such as the Internet or the like.

Each VPLMN 250-1, 250-2, and 250-3 may include a corresponding AMF, such as an AMF 251-1 for VPLMN 250-1, an AMF 251-2 for VPLMN 250-2, and an AMF 251-3 for VPLMN 250-3. Each VPLMN 250-1, 250-2, and 250-3 may also include a corresponding PCF, each of which may also be referred to as a visited-PCF (V-PCF), such as a V-PCF 253-1 for VPLMN 250-1, a V-PCF 253-2 for VPLMN 250-2, and a V-PCF 253-2 for VPLMN 250-3. Each VPLMN 250-1, 250-2, and 250-3 may provide support/network connectivity for services provided by one or more of slice types: Slice-1 202-1, Slice-2 202-2, Slice-3 202-3, Slice-4 202-4, Slice-5 202-5, and/or Slice-6 202-6. For example, VPLMN 250-1 may provide the first slice type Slice-1 202-1, the second slice type Slice-2 202-2, and the third slice type Slice-3 202-3. VPLMN 250-2 may provide the fourth slice type Slice-4 202-4, the fifth slice type Slice-5 202-5, and the sixth slice type Slice-6 202-6. VPLMN 250-3 may provide support for only the fourth slice type Slice-4 202-4. It is to be understood that the slice types supported by each VPLMN 250-1, 250-2, and 250-3 is provided for illustrative purposes only and is not meant to limit the broad scope of the present disclosure.

AMF 251-1 for VPLMN 250-1 may interface V-PCF 253-1 and also with each slice type provided by VPLMN 250-1. Although not shown, V-PCF 253-1 may also interface with each slice type provided by VPLMN 250-1. AMF 251-2 for VPLMN 250-2 may interface with V-PCF 253-2 and also with each slice type provided by VPLMN 250-2. Although not shown, V-PCF 253-2 may also interface with each slice type provided by VPLMN 250-3. AMF 251-3 for VPLMN 250-3 may interface with V-PCF 253-3 and also with the slice type provided by VPLMN 250-3. Although not shown, V-PCF 253-3 may also interface with each slice type provided by VPLMN 250-3.

It is to be understood that other network elements may be configured for the HPLMN 220 and/or any of VPLMNs 250-1, 250-2, and/or 250-3 for any combination of 3G/4G/5G/nG implementations, such as any combination of a Policy and Charging Rules Function (PCRF), a Network Slice Selection Function (NSSF), a Network Repository Function (NRF), a UDM/UDR, a Home Subscriber Server (HSS), a Mobility Management Entity (MME), a Serving Gateway (SGW), a Packet Data Network (PDN) Gateway (PGW), any Control and User Plane Separation (CUPS) components, and/or the like in accordance with any 3GPP specifications.

In at least one embodiment, RAN 240 may include any combination of one or more 3GPP 5G/nG gNB or gNodeB 242 and/or 3GPP 4G/LTE evolved node Bs (eNodeBs or eNBs) (not shown) to facilitate network connectivity between UE 210 and any of VPLMN 250-1, 250-2, or 250-3. A gNodeB/eNodeB, such as gNodeB 242, may implement a wireless wide area (WWA) (e.g., cellular) air interface and, in some instances also a wireless local area (e.g., Wi-Fi®) air interface, for any combination of Radio Access Technology (RAT) types (sometimes referred to more generally as 'accesses') for RAN 240 such as, 3GPP WWA licensed spectrum accesses (e.g., 4G/LTE, 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum WLA accesses such as IEEE 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like. Thus, a RAN 240, including any combination of gNodeBs/eNodeBs, may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G/NR, CBRS, etc.) through which one or more UE, such as UE 210, may utilize to connect to RAN 240 for one or more sessions (e.g., voice, video, data, gaming, combinations thereof, etc.).

A UE, such as UE 210, may be associated with any user, subscriber, employee, client, customer, electronic device, etc. wishing to initiate a flow in system 200 and may be inclusive of any device that initiates a communication in system 200, such as a computer, an electronic device such as an industrial device (e.g., a robot), automation device, enterprise device, appliance, Internet of Things (IoT) device (e.g., sensor, monitor, etc.), a laptop or electronic notebook, a router with a WWA/WLA interface, a WWA/WLA (cellular/Wi-Fi®) enabled telephone/smart phone, tablet, etc. and/or any other device, component, element, or object capable of initiating voice, audio, video, media, or data exchanges within system 200. Although not shown in FIG. 2, it is to be understood that a RAN can also be provided for HPLMN 220 to facilitate network connectivity between UE 210 and HPLMN 220 when UE 210 is not roaming.

RAN 240 may interface with each VPLMN 250-1, 250-2, 250-3 (e.g., with each AMF and each slice type for each VPLMN via one or more wired and/or wireless interfaces. RAN 240 may also interface with UE 210 via one or more over-the-air Radio Frequency (RF) connections. The various interfaces shown in FIG. 2 are provided for illustrative purposes only and are not meant to limit the broad scope of the present disclosure. It is to be understood that network connectivity/interfaces among any of UE 210, HPLMN 220, RAN 240, VPLMN 250-1, VPLMN 250-2, and VPLMN 250-3, and any elements/logic associated therewith, may be provided in any manner/configuration in accordance with 3GPP standards to facilitate operations as discussed for embodiments herein.

In addition to various operations discussed for techniques herein, an AMF, such as any of AMF 221, AMF 251-1, AMF 251-2, and AMF 251-3, may facilitate access and mobility management control/services for one or more UE, such as UE 210, to facilitate an over-the-air RF connection between the UE 210 a corresponding HPLMN/VPLMN. In addition to various operations discussed for techniques herein, an SMF may be responsible for UE PDU session management (SM), with individual functions/services being supported on a per-session basis in order to facilitate data transfer(s) between a UE and one or more data network(s) (e.g., the Internet, an Internet Protocol (IP) Multimedia Subsystem (IMS). Generally, a UPF, such as UPF, may operate to provide packet routing and forwarding operations for user data traffic and may also perform a variety of functions such as packet inspection, traffic optimization, Quality of Service (QoS), policy enforcement and user data traffic handling (e.g., to/from one or more data network(s)), and billing operations (e.g., accounting, etc.) for UE 210 sessions.

Typically, the UDM 224 stores subscription data for subscribers (e.g., UE 210) that can be retrieved and/or otherwise obtained/utilized during operation of system 200. Typically, a PCF, such as any of H-PCF 223, V-PCF 253-1, V-PCF 253-2, and V-PCF 253-2 can store policy data for the HPLMN 220 to provide policy control services (e.g., to facilitate access control for UE 210, etc.). In one instance, H-PCF 223 may be implemented as an Access Management (AM) PCF (AM-PCF).

Typically, an SOR-AF, such as SOR-AF 222, provides Steering of Roaming services to network functions, such as UDM 224, to enable the retrieval of SOR information that can be transmitted to a UE, such as UE 210 to facilitate network selection by the UE for establishing a network connection with a given PLMN. Per current 3GPP standards (e.g., as discussed above for FIG. 1), standards-based SOR information includes a list of preferred PLMNs from which the UE can select a given PLMN with which to establish a connection.

However, in accordance with at least one embodiment, SOR-AF 222 can be enhanced to store a VPLMN:Slice priority list 230, as shown in FIG. 2, that provides a mapping of prioritized VPLMNs to which the UE 210 can seek connection in which each of a given prioritized VPLMN in the list can be enhanced or extended to include slicing metadata that indicates network slice type(s) (S-NSSAI(s)) supported by each of the given prioritized VPLMN identified in the list. Thus, the roaming priority list semantics can be extended in accordance with certain embodiments herein to include slicing metadata that indication slice type(s) (S-NSSAI(s)) supported by each of a given prioritized VPLMN in order to provide a VPLMN:Slice priority list in accordance with certain embodiments herein. The VPLMN:Slice priority list 230 can be configured for SOR-AF 222 by the home network operator HPLMN 220 based on roaming agreements between the home network operator one or more visited network operators of VPLMNs 250-1, 250-2, and 250-3. In some embodiments, the VPLMN:Slice priority list 230 may be stored in the UDM 224 rather than in the SOR-AF 222.

As shown in FIG. 2, in at least one embodiment, according to a first technique to facilitate visited network selection by UE 210 based on slice considerations, SOR-AF 222 can be configured with VPLMN:Slice priority list 230 that includes a prioritized list that prioritizes VPLMNs 250-1, 250-2, and 250-3 and the slices types (e.g., S-NSSAIs) supported by each VPLMN within the VPLMN:Slice priority list 230. In essence, the VPLMN:Slice priority list 230 provides a mapping of prioritized VPLMNs to the slice type(s) (S-NSSAI(s)) supported by each VPLMN, which information can be obtained by UE 210 from SOR-AF 222 in order to select a highest priority VPLMN that supports a slice type sought by the UE 210 in order to establish a network connection by the UE 210 for the slice type when the UE 210 is roaming among VPLMNs 250-1, 250-2, and 250-3.

For example, VPLMN 250-1 (identified via VPLMN-ID: '111-222') may be configured in the VPLMN:Slice priority list 230 to be the highest priority VPLMN with which UE 210 may seek connection (e.g., first/highest in the list, when ordered top-down from highest priority (top) to lowest priority (bottom)) and is mapped to identify that the first slice type Slice-1 202-1, the second slice type Slice-2 202-2, and the third slice type Slice-3 202-3 are provided by VPLMN 250-1 (e.g., 111-222: 1, 2, 3). Next, VPLMN 250-2 (identified via VPLMN-ID: '222-333') may be configured in the VPLMN:Slice priority list 230 to be the second highest priority VPLMN with which UE 210 may seek connection (e.g., second highest in the list, when ordered top-down from highest priority (top) to lowest priority (bottom)) and is mapped to identify that the fourth slice type Slice-4 202-3, the fifth slice type Slice-5 202-5, and the sixth slice type Slice-6 202-6 are provided by VPLMN 250-2 (e.g., 222-333: 4, 5, 6). Finally, VPLMN 250-3 (identified via VPLMN-ID: '444-555') is configured in the VPLMN:Slice priority list 230 to be the third highest priority VPLMN or, stated differently, the lowest priority VPLMN, with which UE 210 may seek connection (e.g., at the bottom of the list, when ordered top-down from highest priority (top) to lowest priority (bottom)) and is mapped to identify that the fourth slice type Slice-4 202-4 is provided by VPLMN 250-3 (e.g. 444-555: 4).

It is to be understood that the priority of the VPLMNs illustrated for FIG. 2 is provided for illustrative purposes only and is not meant to limit the broad scope of the present disclosure. Virtually any priority of VPLMNs can be configured for a VPLMN:Slice priority list in accordance with embodiments herein based on any combination of factors, such as service metrics/quality for each VPLMN, service cost associated with each VPLMN and/or slice type provided by each VPLMN, SLAs and/or roaming agreements between each VPLMN and an HPLMN, and/or the like.

Further, in some embodiments, multiple VPLMN:Slice priority lists can be stored in SOR-AF 222, such that slices types provided by different VPLMNs may vary based on location. For example, slices are often a location specific service, offered by a network operator within a given network location such that when a slice is not available in a location, it is not identified to a UE. For FIG. 2, the slices provided among each VPLMN 250-1, 250-2, and 250-3 may be provided based on the on the location of the coverage area provided by RAN 240. In some instances, it is possible that the offered set of slices by a given operator may change based on the location. For example, a gaming slice may be offered urban areas and not for rural areas. Thus, techniques herein may factor in the location of a UE, which can be determined, at least in part, based on the VPLMN to which the UE initially attaches, other roaming partners in the area of the VPLMN, and the supported slices by those operators in configuring one or more VPLMN:Slice priority lists for one or more locations to facilitate visited network selection by the UE in accordance with embodiments herein.

Still further, in some embodiments, a VPLMN:Slice priority list can be further extended to include time information, such as time of day (ToD), one or more ToD ranges, or the like such a time factor contained in the list may influence UE network selection. For example, in one instance, a VPLMN:Slice priority list could be further extended to include a time factor for VPLMN 250-3 (VPLMN-ID: 444-555), as shown in TABLE 1, below, which indicates that VPLMN 250-3 is to be selected for network attachment involving Slice-4 202-4 over the higher priority VPLMN 250-2 (VPLMN-ID: 222-333) for a time of day between 4:00 PM and 8:00 PM. For all other times, outside of 4:00 PM thru 8:00 PM, VPLMN 250-2 (VPLMN-ID: 222-333) would remain the higher priority VPLMN with regard to the fourth slice type Slice-4 202-4.

TABLE 1

| VPLMN:Slice Priority List Extended with Time Information | |
|---|---|
| VPLMN-ID Priority | Slice(s) Supported + Time Factor |
| 111-222 | 1, 2, 3 |
| 222-333 | 4, 5, 6 |
| 444-555 | 4 (4:00 PM-8:00 PM) |

In another embodiment, according to a second technique to facilitate visited network selection by UE 210 based on slice considerations, H-PCF 223 can be configured with a VPLMN:Slice mapping 232 that identifies the slice types provided by each VPLMN 250-1, 250-2, 250-3 (but not the priority for each VPLMN) and a standards-based SOR-AF (not configured with the VPLMN:Slice priority list 230) can provide standards-based SOR information (e.g., a roaming priority list including the priority for each of VPLMN 250-1, 250-2, and 250-3) to UE 210. For example, when UE 210 is roaming according to the second technique, the H-PCF 223 can communicate with a given V-PCF in order to send the VPLMN:Slice mapping 232 to the given V-PCF, which can then send the mapping to UE 210 via a given VPLMN AMF/RAN to which the UE 210 is connected. The H-PCF 223 can communicate with each V-PCF 253-1, 253-2, and 253-3 via a corresponding 3GPP N24 interface (not shown) in accordance with 3GPP standards.

In one embodiment, each corresponding V-PCF 253-1, 253-2, and 253-3 can send supported slices for each corresponding VPLMN 250-1, 250-2, and 250-3 to H-PCF 223 and H-PCF 223 can use this information to generate the VPLMN:Slice mapping 232.

Both the VPLMN:Slice mapping 232 obtained by the UE 210 from H-PCF 223 and the standards-based SOR information including the prioritized list of VPLMNs obtained by the UE 210 can be correlated together by the UE 210 for the second technique in order for the UE 210 to select a highest priority VPLMN that supports a slice type sought by the UE 210 with which to establish a network connection by the UE 210 for the slice type when the UE 210 is roaming among VPLMNs 250-1, 250-2, and 250-3 to facilitate visited network selection by the UE 210 based on slice considerations associated with each of VPLMN 250-1, VPLMN 250-2, and VPLMN 250-3. Additional details for this embodiment are discussed below with reference to FIG. 4 in which H-PCF 223 can push the VPLMN:Slice mapping 232 to UE 210 via a corresponding V-PCF.

Broadly, any of a PCF (e.g., a H-PCF and/or a V-PCF), a UDM, and/or an SOR-AF may be referred to generally as a 'policy function' or a 'network policy function' that may store policies for one or more subscribers/UEs, such as any combination of roaming priority lists, VPLMN:Slice priority lists, and/or VPLMN:Slice mappings, which can be provided from a home mobile network to a UE that is roaming among multiple VPLMNs in order to facilitate visited mobile network selection by the UE based on slice considerations.

Thus, techniques provided by system 200 to facilitate visited network selection by UE 210 is be based on the principle that UE 210 is provided with information regarding slice type(s) (S-NSSAI(s)) supported by roaming partners/visited networks (e.g., VPLMNs 250-1, 250-2, and 250-3) along with priority information for the roaming partners/visited network so that UE 210 can select the most preferred VPLMN from that supports the intended slice type (S-NSSAI) with which the UE 210 seeks to establish a network connection when the UE 210 roaming among the visited networks.

Figure 3:
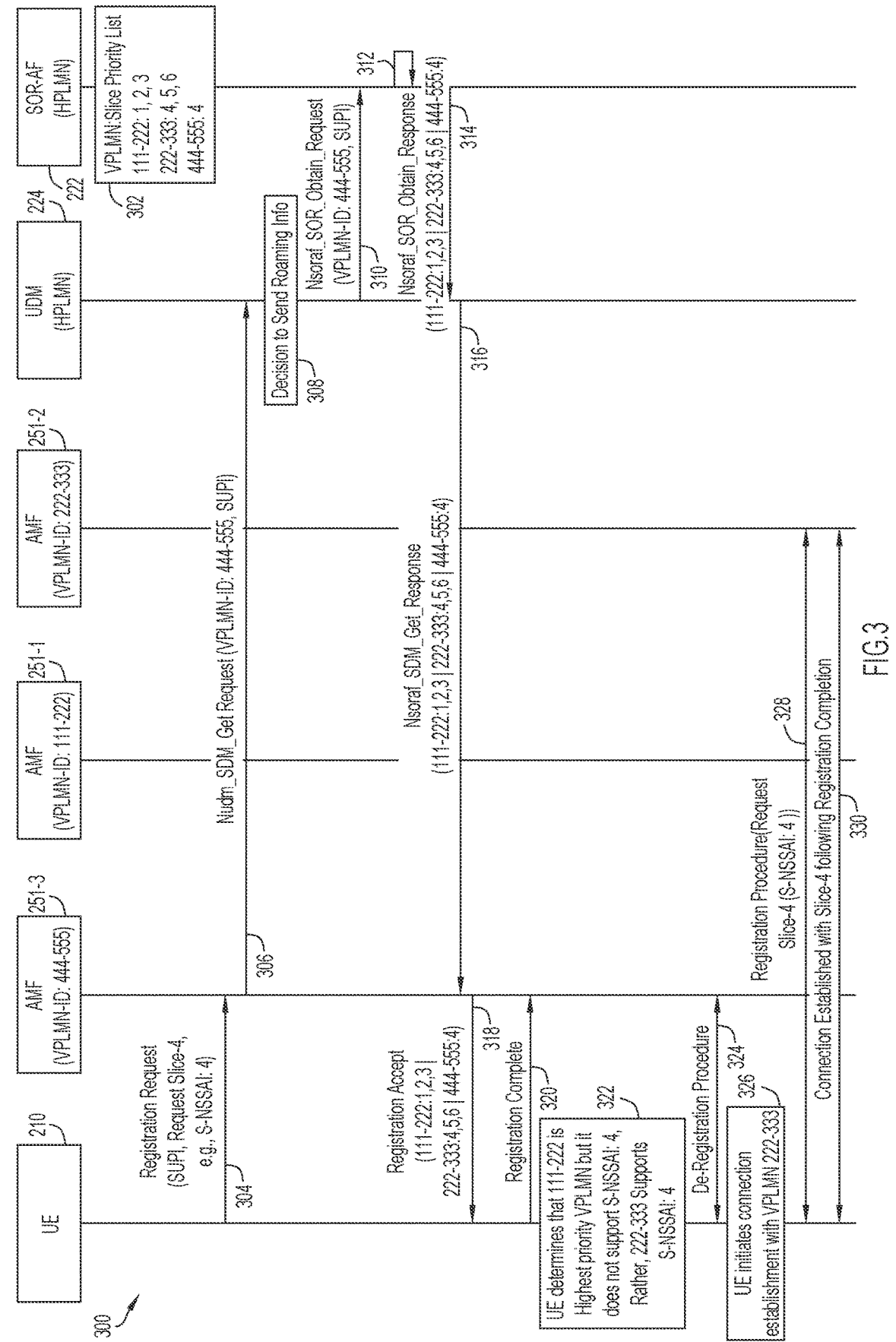
FIG. 3 is a message sequence diagram illustrating a call flow associated with facilitating visited network selection by a user equipment based on slice considerations utilizing a first technique, according to an example embodiment.
Figure 4:
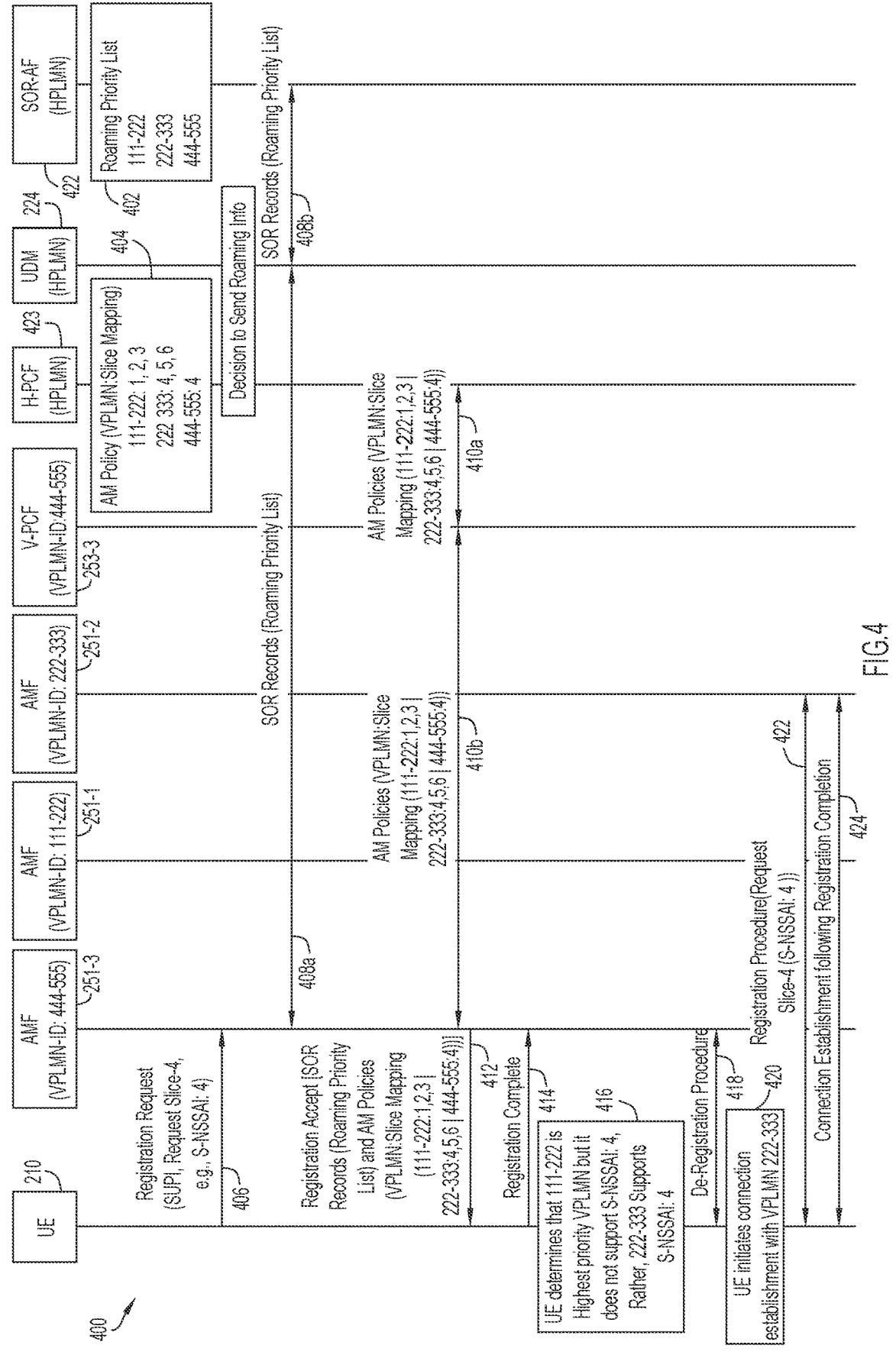
FIG. 4 is a message sequence diagram illustrating another call flow associated with facilitating visited network selection by a user equipment based on slice considerations utilizing a second technique, according to an example embodiment.

As noted above, two techniques associated can be utilized to facilitate visited network selection by UE 210 based on slice considerations. FIG. 3, discussed below, is message sequence diagram illustrating a call flow 300 associated with facilitating visited network selection by UE 210 based on slice considerations, according to a first technique of embodiments herein. FIG. 4, also discussed below, is a message sequence diagram illustrating a call flow 400 associated with facilitating visited network selection by UE 210 based on slice considerations, according to a second technique of embodiments herein.

Referring to FIG. 3 illustrating example details associated with the first technique through which embodiments herein my facilitate visited network selection by a UE based on slice considerations, FIG. 3 includes UE 210, AMF 251-1 for VPLMN 250-1 (VPLMN-ID/MCC-MNC: 111-222), AMF 251-2 for VPLMN 250-2 (VPLMN-ID/MCC-MNC: 222-333), AMF 251-3 for VPLMN 250-3 (VPLMN-ID/ MCC-MNC: 444-555), UDM 224 of HPLMN 220 and SOR-AF 222 of HPLMN 220. Although not illustrated in FIG. 3, it is to be understood that UE 210 is connected to RAN 240 (e.g., via gNodeB 242 within RAN 240) in order to perform communications/operations via HPLMN 220 and one or more of VPLMN(s) 250-1, 250-2, and/or 250-3.

Broadly, for the first technique, when UE 210 is roaming among VPLMNs 250-1, 250-2, and 250-3 and the home network operator of HPLMN 220 has a roaming agreement with the visited network operators for each of VPLMNs 250-1, 250-2, and 250-3 and is aware of the S-NSSAI(s) provided by the VPLMNs as part of an SLA contract/ roaming agreement, the prioritized list of VPLMNs mapped to slice types (S-NSSAI(s)) provided by each VPLMN as configured via VPLMN:Slice priority list 230 is provided to UE 210 by the SOR-AF 222 of the HPLMN 220. The UE 210 can parse the list to select the highest priority VPLMN that provides the slice type sought by the UE 210 in order to establish a network connection with the selected VPLMN.

For example, as shown in FIG. 3, consider, at 302, that SOR-AF 222 is configured with the VPLMN:Slice priority list (232, as shown in FIG. 2) in which VPLMN 250-1 is identified as the highest priority VPLMN with which UE 210 may seek connection and is mapped to identify that the first slice type Slice-1 202-1, the second slice type Slice-2 202-2, and the third slice type Slice-3 202-3 are provided by VPLMN 250-1 (e.g., 111-222: 1, 2, 3). Next, VPLMN 250-2 is identified to be the second highest priority VPLMN with which UE 210 may seek connection and is mapped to identify that the fourth slice type Slice-4 202-3, the fifth slice type Slice-5 202-5, and the sixth slice type Slice-6 202-6 are provided by VPLMN 250-2 (e.g., 222-333: 4, 5, 6). Finally, VPLMN 250-3 is identified to be the third highest priority VPLMN (or the lowest priority VPLMN) and is mapped to identify that the fourth slice type Slice-4 202-4 is provided by VPLMN 250-3 (e.g. 444-555: 4).

At 304, consider that UE 210 latches on to/begins connection establishment with VPLMN 250-3 (e.g., via gNodeB 242) and initiates a registration procedure with the VPLMN 250-3 via a Registration Request message sent to AMF 251-3 in which the UE 210 requests network connectivity for the fourth slice type Slice-4 202-4 (e.g., S-NSSAI: 4). In various embodiments, UE 210 may be preconfigured with a list of VPLMN(s) from which it may select to perform the initial registration and/or may select any VPLMN that is available. The Registration Request message includes an identifier for the UE 210, such a Subscription Permanent Identifier (SUPI), as shown in FIG. 3. It is to be understood that any UE identifier may be utilized in accordance with embodiments herein, such as an International Mobile Subscriber Identity (IMSI), a Subscription Concealed Identifier (SUCI), and/or the like.

Obtaining the Registration Request by AMF 251-3 triggers AMF 251-3 to request subscriber information for UE 210 from UDM 224, as shown at 306, via a Nudm_SDM_Get_Request (Subscriber Data Management) message in which the request includes the VPLMN-ID: 444-555 for VPLMN 250-3 and the identifier for the UE 210 (SUPI). Based on the request, the HPLMN 220/UDM 224, decides, at 308, to push SOR information to the UE 210.

For example, in one embodiment at 310, UDM 224 can initiate a request for SOR information from SOR-AF 222 (via an Nsoraf_SOR_Obtain_Request message) that includes the VPLMN-ID: 444-555 for VPLMN 250-3 and the identifier for the UE (SUPI). At 312, the SOR-AF 222 identifies the VPLMN:Slice priority list 230 based on the VPLMN-ID: 444-555 of VPLMN 250-3 being included in the list. Recall, multiple VPLMN:Slice priority lists can be stored in SOR-AF 222 associated with different network locations at which slices provided by VPLMNs may vary.

Upon identifying the VPLMN:Slice priority list 230, SOR-AF 222 responds at 314 (via an Nsoraf_SOR_Obtain_ Response message) that includes the prioritized list of corresponding VPLMN-IDs for each of VPLMNs 250-1, 250-2, and 250-3 along with an indication for each of one or more slice type(s) (S-NSSAI(s)) supported/provided by each corresponding VPLMN 250-1, 250-2, and 250-3 (e.g., 111-222:1, 2, 3| 222-333:4, 5, 6| 444-555:4, where '|' represents a concatenation for each prioritized VPLMN to slice indication/mapping included in an Information Element (IE) or the like for the message sent at 314).

In another embodiment, if the VPLMN:Slice priority list 230 is configured for UDM 224 rather than SOR-AF 222, the operations at 310, 312, and 314 can be eliminated and the UDM 224 can identify the VPLMN:Slice priority list 230 using similar techniques as the SOR-AF 222 in order to facilitate providing the VPLMN:Slice priority list 230 to UE 210.

Following from the operations discussed above at 314 for the present embodiment, at 316, the prioritized list of corresponding VPLMNs 250-1, 250-2, and 250-3 and the indication for the one or more slice type(s) provide by each corresponding VPLMN 250-1, 250-2, and 250-3 is pushed to AMF 251-3 via an Nudm_SDM_Get_Response message including the prioritized list and slice information as slice extensions associated with each VPLMN-ID for (e.g., 111-222:1, 2, 3|222-333:4, 5, 6| 444-555:4), as shown at 316. At 318, AMF 251-3 pushes the prioritized list and corresponding slice information for each of VPLMN 250-1, 250-2, and 250-3 to UE 210 via a Registration Accept message including each VPLMN-ID and associated slice information (e.g., 111-222:1, 2, 3| 222-333:4, 5, 6| 444-555:4), to which UE 210 responds with a Registration Accept message at 320.

At 322, consider that UE 210, via VPLMN/slice selection logic 212, analyzes the prioritized list and slice information and determines that VPLMN 250-1 (VPLMN-ID: 111-222) is the highest priority VPLMN, but it does not support the fourth slice type Slice-4 202-4 (S-NSSAI=4). Rather, the UE 210, via VPLMN/slice selection logic 212, determines that VPLMN 250-2 is the highest priority VPLMN that does support the fourth slice type Slice-4 (S-NSSAI: 4) and also determines that it is not registered to VPLMN 250-2 but instead is registered to VPLMN 250-3 (VPLMN-ID: 444-555), which does support the fourth slice type, but is a lower priority VPLMN than VPLMN 250-2.

Based on the determination at 322 that it is to connect to the higher priority VPLMN 250-2 (VPLMN-ID: 222-333), UE 210 triggers a de-registration procedure with VPLMN 250-3 at 324 and initiates connection establishment with VPLMN 250-2 (VPLMN-ID: 222-333) at 326 and 328 via a registration procedure with VPLMN 250-2 via AMF 251-2 in which the registration procedure indicates the fourth slice type Slice-4 (S-NSSAI: 4) for which UE 210 is seeking services. As shown at 330, the network connection with the fourth slice type Slice-4 (S-NSSAI: 4) provided by VPLMN 250-2 is established following completion of the registration procedure. Thus, FIG. 3 illustrates the first technique through which embodiments herein can facilitate visited network selection by a UE based on slice considerations.

Although not shown in FIG. 3, if UE 210 had determined at 322 that the VPLMN with which it had previously completed the registration at 318 was the highest priority VPLMN that supported the slice type requested by the UE, the operations could have ended at 322 with the UE maintaining the registration/network connection with the VPLMN/slice type provided by the VPLMN.

Moving to FIG. 4 illustrating example details associated with the second technique through which embodiments herein my facilitate visited network selection by a UE based on slice considerations, call flow 400 of FIG. 4 includes UE 210, AMF 251-1 for VPLMN 250-1 (VPLMN-ID/MCC-MNC: 111-222), AMF 251-2 for VPLMN 250-2 (VPLMN-ID/MCC-MNC: 222-333), AMF 251-3 and V-PCF 253-3 for VPLMN 250-3 (VPLMN-ID/MCC-MNC: 444-555), UDM 224, an H-PCF 423 configured with a VPLMN:Slice mapping and an SOR-AF 422 in which SOR-AF 422 for the embodiment of FIG. 4 is assumed to not be configured with a VPLMN:Slice priority list as discussed above with reference to operations for the first technique. Although not illustrated in FIG. 4, it is to be understood that UE 210 is connected to RAN 240 (e.g., via gNodeB 242 within RAN 240) in order to perform communications/operations via HPLMN 220 and one or more of VPLMN(s) 250-1, 250-2, and/or 250-3.

Rather, for the second technique, consider that SOR-AF 422 is configured, at 402, with a standards-based roaming priority list (RPL) that identifies: VPLMN 250-1 as a highest priority VPLMN (e.g., 111-222 is first/highest in the list, when ordered top-down from highest priority (top) to lowest priority (bottom)), VPLMN 250-2 as the second highest priority VPLMN (e.g., 222-333 is second highest in the list, when ordered top-down from highest priority (top) to lowest priority (bottom)), and identifies VPLMN 250-3 as the third highest priority (or lowest priority) VPLMN (e.g., 444-555 is at the bottom of the list, when ordered top-down from highest priority (top) to lowest priority (bottom)). Although not shown in FIG. 4, in some embodiments the roaming priority list can be configured for UDM 224 rather than SOR-AF 422.

Further for the second technique, when the HPLMN 220 has a roaming agreement with the VPLMNs 250-1, 250-2, and 250-3 and is aware of the slice type(s) (S-NSSAI(s)) provided by the VPLMNs as part of an SLA contract/roaming agreement, an AM policy including the VPLMN: Slice mapping can be configured for H-PCF 423 (e.g., an AM PCF), as shown at 404. In various embodiments, the AM policy including the VPLMN:Slice mapping can be configured for H-PCF 423 via an Operations, Administration, and Maintenance (OA&M) function (not shown) within HPLMN 220, via an external application function (AF) and/or. As discussed below, the AM policy including the VPLMN:Slice mapping can be sent to UE 210 by H-PCF

423 via a given V-PCF (e.g., utilizing the 3GPP N24 interface (not shown) provided for the PCFs) in order to facilitate visited network selection by UE 210 according to slice considerations.

As shown in FIG. 4, the VPLMN:Slice mapping as configured at 404 identifies that the first slice type Slice-1 202-1, the second slice type Slice-2 202-1, and the third slice type Slice-3 202-3 are provided by VPLMN 250-1 (e.g., 111-222: 1, 2, 3), that the fourth slice type Slice-4 202-4, the fifth slice type Slice-5 202-5, and the sixth slice type Slice-6 202-6 are provided by VPLMN 250-2 (e.g., 222-333: 4, 5, 6), ad that the fourth slice type Slice-4 202-4 is provided by VPLMN 250-3 (e.g., 444-555: 4). For the embodiment of FIG. 4, the order of the VPLMNs identified in the VPLMN: Slice mapping as configured at 404 is not meant to infer a priority, rather the priority of the VPLMNs can be obtained by UE 210 via the roaming priority list obtained from SOR-AF 422. As discussed below, the AM policy including the VPLMN:Slice mapping, and any other AM policies that may be prescribed, can be pushed to UE 210 during initial registration with a given VPLMN by the H-PCF 423 (e.g., a H-AM-PCF).

When UE 210 is roaming among VPLMNs 250-1, 250-2, and 250-3 for the second technique and registers with a given VPLMN, at 406, consider that UE 210 latches on to/begins connection establishment with VPLMN 250-3 and initiates a registration procedure with the VPLMN 250-3 via a Registration Request message sent to AMF 251-3 in which the UE 210 requests network connectivity for the fourth slice type Slice-4 202-4 (e.g., S-NSSAI: 4). The Registration Request message includes an identifier for the UE 210, such a SUPI, as shown in FIG. 4.

Obtaining the Registration Request by AMF 251-3 triggers AMF 251-3 to obtain SOR records, such as the roaming priority list configured at 402, for UE 210, as shown at 408a and 408b, which can be performed using an Nudm_SDM_Get_Request/Response exchange with UDM 224 as discussed above at 306 and 316 and an Nsoraf_SO-R_Obtain_Request/Response exchange between UDM 224 and SOR-AF 422, except that the roaming priority list as configured at 402 is returned to the AMF 251-3 for the embodiment of FIG. 4, rather than the VPLMN:Slice priority list as discussed for FIG. 3. In another embodiment, if the roaming priority list is configured for UDM 224 rather than SOR-AF 422, then the operations at 408b can be eliminated and the UDM 224 can identify the roaming priority list for UE 210, which can be provided to AMF 251-3.

Further, at 410a, H-PCF 423 provides policies, such as AM policies shown for the embodiment of FIG. 4, to V-PCF 253-3 (e.g., via a 3GPP N24 interface), which for the embodiment of FIG. 4 involves the H-PCF 423 providing the VPLMN:Slice mapping information as configured for H-PCF 423 at 404 (e.g., 111-222:1, 2, 3| 222-333:4, 5, 6| 444-555:4, where '|' represents a concatenation for each VPLMN:slice mapping included in an IE or the like for the AM policies). Although not shown in FIG. 4, the V-PCF 253-3 can be triggered by the AMF 251-3 to request the policies that include the VPLMN:Slice mapping information from H-PCF 423. In various embodiments, the policies including the mapping information can be AM policies facilitated via a 3GPP AMPolicyService, UE policies facilitated via a 3GPP UEPolicyService, SM policies facilitated via a 3GPP SMPolicyService, etc. In at least one embodiment, a new Application Programming Interface (API) may be defined for the N24 interface such that any V-PCF can request policy information that includes VPLMN:Slice mapping information from an H-PCF. At 410*b*, V-PCF 253-3 provides the policies including the VPLMN:Slice mapping information to AMF 251-3.

At 412, AMF 251-3 pushes the SOR records (including the roaming priority list) and the policies that includes the indication of which slice types (S-NSSAI(s)) are provided by which VPLMNs (based on the VPLMN:Slice mapping at 404) via a Registration Accept message including each VPLMN-ID and associated slice information (e.g., 111-222: 1, 2, 3| 222-333:4, 5, 6|444-555:4), to which UE 210 responds with a Registration Accept message at 414.

At 416, the UE 210, based on its service requirement in requesting the fourth slice Slice-4 (S-NSSAI: 4), the AM policy including the VPLMN:Slice mapping, and the SOR records including the roaming priority list, selects (via VPLMN/slice selection logic 212) the VPLMN that is highest in priority and also supports the S-NSSAI that is to provide services to UE 210. For example, at 416, UE 210 (via VPLMN/slice selection logic 212) using the VPLMN-ID of each of VPLMN 250-1 (VPLMN-ID: 111-222), VPLMN 250-2 (VPLMN-ID: 222-333), and VPLMN 250-3 (VPLMN-ID: 444-555) identified in both the VPLMN:Slice mapping and the roaming priority list can correlate the priority of each VPLMN as identified in the roaming priority list to the indication of the slice types supported by each VPLMN identified in the VPLMN:Slice mapping in order to select the highest priority VPLMN of the VPLMNs that provides the slice type requested by the UE as identified using both the VPLMN:Slice mapping and the roaming priority list.

For example, at 416, consider that UE 210, via VPLMN/ slice selection logic 212, analyzes the VPLMN:Slice mapping and the roaming priority list and, by correlating/ identifying the corresponding VPLMN-IDs included in both the mapping and the roaming priority list, determines that VPLMN 250-1 (VPLMN-ID: 111-222) is the highest priority VPLMN, but it does not support the fourth slice type Slice-4 202-4 (S-NSSAI=4). Rather, the UE 210, via VPLMN/slice selection logic 212, determines that VPLMN 250-2 is the highest priority VPLMN that does support the fourth slice type Slice-4 (S-NSSAI: 4) and also determines that it is not registered to VPLMN 250-2 but instead is registered to VPLMN 250-3 (VPLMN-ID: 444-555), which does support the fourth slice type, but is a lower priority VPLMN than VPLMN 250-2.

Based on the determination at 416 that it is to connect to the higher priority VPLMN 250-2 (222-333), UE 210 triggers a de-registration procedure with VPLMN 250-3 at 418 and initiates connection establishment with VPLMN 250-2 (VPLMN-ID: 222-333) at 420 and 422 via a registration procedure with VPLMN 250-2 via AMF 251-2 in which the registration procedure indicates the fourth slice type Slice-4 (S-NSSAI: 4) for which UE 210 is seeking services. As shown at 424, the network connection with the fourth slice type Slice-4 (S-NSSAI: 4) provided by VPLMN 250-2 is established following completion of the registration procedure.

Thus, FIG. 4 illustrates the second technique through which embodiments herein can facilitate visited network selection by a UE based on slice considerations. For the second technique, when a UE (e.g., UE 210) is roaming and initiates registration onto a particular visited network, the PCF of the HPLMN for the UE (e.g., H-PCF 423) can provide the UE with one or more AM policies that identifies which VPLMN supports which NSSAI(s), which the UE can correlate with a roaming priority for each of the VPLMNs as identified via a roaming priority list obtained from an SOR-AF of the HPLMN (e.g., SOR-AF 422) in order to select the highest priority VPLMN of the VPLMNs that provides the slice type requested by the UE.

Referring to FIG. 5, FIG. 5 is a flow chart depicting a method 500 according to an example embodiment. In at least one embodiment, method 500 illustrates example operations that may be performed, at least in part, by a user equipment, such as UE 210.

At 502, the method may include requesting, by a user equipment (e.g., UE 210) that is roaming among a plurality of visited mobile networks (e.g., UE 210 roaming among VPLMNs 250-1, 250-2, and 250-3), registration for a network connection associated with a slice type (e.g., S-NSSAI).

At 504, the method may include, obtaining, by the user equipment from a home mobile network of the user equipment (e.g., HPLMN 220), a priority for each of the plurality of visited mobile networks and an indication of one or more slice types provided by each of the plurality of visited mobile networks.

In at least one embodiment, as shown at 504*a*, the obtaining can include obtaining the priority for each of the plurality of visited mobile networks and the indication of the one or more slice types provided by each of the plurality of visited mobile networks from a 3GPP SOR-AF or a 3GPP UDM of a home mobile network for the user equipment (e.g., SOR-AF 222 or UDM 224, as shown in FIG. 2) such that the priority for each of the plurality of visited mobile networks and the indication of the one or more slice types is provided via a VPLMN:Slice priority list (e.g., VPLMN: Slice priority list 230)

In another embodiment, as shown at 504*b*, the obtaining can include obtaining the priority for each of the plurality of visited mobile networks from a 3GPP SOR-AF or a 3GPP UDM of a home mobile network for the user equipment (e.g., SOR-AF 422 of FIG. 4) and obtaining the indication of the one or more slice types provided by each of the plurality of visited mobile networks from a 3GPP PCF of the home mobile network for the user equipment (e.g., H-PCF 423 of FIG. 4) such that the priority for each of the plurality of visited mobile networks is obtained via a roaming priority list (e.g., as shown at 402 of FIG. 4) and the indication of the one or more slice types provided by each of the plurality of visited mobile networks is obtained via a VPLMN:Slice mapping (e.g., VPLMN:Slice mapping 232 and as shown at 404 of FIG. 4).

At 506, the method may include selecting, by the user equipment, a highest priority visited mobile network of the plurality of visited mobile networks that provides the slice type.

In at least one embodiment, as shown at 506*a*, the selecting may be performed by the user equipment based on the priority for each of the plurality of visited mobile networks and the indication of the one or more slice types provided by each of the plurality of visited mobile networks obtained from the 3GPP SOR-AF or the 3GPP UDM entity (e.g., as discussed for 504*a* and also for in FIG. 3) to select the highest priority visited mobile network that provides the slice type.

In another embodiment, as shown at 506*b*, the selecting may be performed by the user equipment based on the user equipment correlating the priority for each of the plurality of visited mobile networks obtained from the 3GPP SOR-AF or the 3GPP UDM entity along with the indication of the one or more slice types provided by each of the plurality of visited mobile networks obtained from the 3GPP PCF (e.g., as discussed for 504*b* and as shown in FIG. 4) to select the highest priority visited mobile network of the plurality that provides the slice type.

At 508, the method may include establishing, by the user equipment, the network connection with the highest priority visited mobile network of the plurality of visited mobile networks that provides the slice type (e.g., as shown in both FIG. 3 and FIG. 4).

Other operations may be performed in accordance with techniques herein. For example, in one instance, if the obtaining is performed by the user equipment via a first visited mobile network and the highest priority mobile network that provides the slice type is a second visited mobile network that is different than the first visited mobile network, the method may further include, performing, by the user equipment, de-registration with the first visited mobile network and performing a registration procedure with the second visited mobile network to establish the network connection. In another instance, if the obtaining is performed by the user equipment via a first visited mobile network and the highest priority mobile network that provides the slice type is the first visited mobile network, the network connection will be established with the first visited mobile network. In still another instance, the priority for each of the plurality of visited mobile networks for the prioritized list can be configured based on a time factor (e.g., ToD, ToD range, etc.), such that identifying the highest priority visited mobile network can be based on a time at which the network connection is established by the user equipment.

Referring to FIG. 6, FIG. 6 is a flow chart depicting another method 600 according to an example embodiment. In at least one embodiment, method 600 illustrates example operations that may be performed, at least in part, by a policy function, such as any combination of an H-PCF (e.g., H-PCF 223 or H-PCF 423), an SOR-AF (e.g., SOR-AF 222 or SOR-AF 422), and/or a UDM (e.g., UDM 224).

At 602, the method may include obtaining, by at least one policy function for a home mobile network for a user equipment, a request for policy information associated with a user equipment in which the user equipment is roaming among a plurality of visited mobile networks and the policy information includes a priority for each of the plurality of visited mobile networks and an indication of one or more slice type(s) provided/supported by each of the plurality of visited mobile networks.

At 604, the method may include providing the policy information to user equipment from the at least one policy function of the home mobile network for the user equipment.

In one embodiment, as shown at 604*a*, the at least one policy function is a 3GPP SOR-AF or a 3GPP UDM and the policy information is a VPLMN:Slice priority list that includes the priority for each of visited mobile networks (VPLMNs) and the indication of the one or more slice type(s) provided by each visited mobile network and the 3GPP SOR-AF or the 3GPP UDM provides the policy information to the user equipment. The priority of each of the plurality of visited mobile networks can be determined based on the order of each network identified in the list or an explicit indication of priority contained in the list (e.g., 1, 2, 3, etc.).

In at least one embodiment, as shown at 604*b*, the at least one policy function is a 3GPP SOR-AF or a 3GPP UDM and also a 3GPP H-PCF in which the policy information includes a roaming priority list that includes the priority for each of the visited mobile networks and a VPLMN:Slice mapping that includes the indication of the one or more slice type(s)

provided/supported by each visited mobile network in which the 3GPP SOR-AF or the 3GPP UDM provides the policy information to the user equipment that includes the priority for each of the visited mobile networks (i.e., the roaming priority list) and the 3GPP H-PCF provides the policy information to the user equipment that includes the indication of the one or more slice type(s) provided/supported by each visited mobile network (i.e., the VPLMN:slice mapping).

In various embodiments, the policy information can be provided to the user equipment via any combination of a visited AMF and/or a V-PCF and a RAN (e.g., the gNodeB to which the user equipment is connected). The policy information can enable the user equipment to select a highest priority visited mobile network to which to connect that supports a slice type with which the user equipment desires a connection/services as provided by the slice type.

Figure 7:
FIG. 7 is a hardware block diagram of a computing device that may perform functions associated with any combination of operations, in connection with the techniques discussed herein.

Referring to FIG. 7, FIG. 7 illustrates a hardware block diagram of a computing device 700 that may perform functions associated with operations discussed herein. In various embodiments, a computing device or apparatus, such as computing device 700 or any combination of computing devices 700, may be configured as any entity/entities as discussed herein in order to perform operations of the various techniques discussed herein, such as, for example, any of AMF 221, AMF 251-1, AMF 251-2, AMF 251-3, H-PCF 223 (e.g., a policy function), UDM 224 (e.g., a policy function), SOR-AF 222 (e.g., a policy function), H-PCF 423 (e.g., a policy function), SOR-AF 422 (e.g., a policy function), V-PCF 253-1, V-PCF 253-2, V-PCF 253-3, VNFs for any of the first slice type Slice-1 202-1, the second slice type Slice-2 202-2, the third slice type Slice-3 202-3, the fourth slice type Slice-4 202-4, the fifth slice type Slice-5 202-5, the sixth slice type Slice-6 202-6, and/or any other network element discussed for embodiments herein.

In at least one embodiment, computing device 700 may be any apparatus that may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., hardware processor(s)) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communications (wired and/or wirelessly) between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) and/or antennas/antenna arrays now known or hereafter developed. Thus, the network processor unit(s) 710 and/or network I/O interface(s) 712 may include suitable interfaces for receiving, transmitting, and/or otherwise communicating (in a wired and/or wireless manner) data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one embodiment in which computing device is implemented as at least one policy function, the control logic can include instructions that, when executed, cause processor(s) 702 to perform functions including obtaining a request for policy information associated with the user equipment in which the user equipment is roaming among a plurality of visited mobile networks and the policy information includes a priority for each of the plurality of visited mobile networks and an indication of one or more slice type(s) provided by each of the plurality of visited mobile networks and providing the policy information to the user equipment by the at least one policy function.

Figure 8:
FIG. 8 is a hardware block diagram of a user equipment that may perform functions associated with any combination of operations, in connection with the techniques discussed herein.

Referring to FIG. 8, FIG. 8 illustrates a hardware block diagram of a user equipment 800 that may perform functions associated with operations discussed herein. In various embodiments, a radio device or apparatus, such as user equipment 800 or any combination of user equipment 800, may be configured as any radio node/nodes as depicted herein in order to perform operations of the various techniques discussed herein, such as operations that may be performed by UE 210, according to an example embodiment.

In at least one embodiment, user equipment 800 may be any apparatus that may include one or more processor(s) 802, one or more memory element(s) 804, storage 806, a bus 808, a baseband processor or modem 810, one or more radio RF transceiver(s) 812, one or more antennas or antenna arrays 814, one or more I/O interface(s) 816, and control logic 820, which may include VPLMN/slice selection logic 822.

The one or more processor(s) 802, one or more memory element(s) 804, storage 806, bus 808, and I/O interface(s) 816 may be configured/implemented in any manner described herein, such as described herein at least with reference to FIG. 7.

The RF transceiver(s) 812 may perform RF transmission and RF reception of wireless signals via antenna(s)/antenna array(s) 814, and the baseband processor (modem) 810 performs baseband modulation and demodulation, etc. associated with such signals to enable wireless communications for user equipment 800.

In various embodiments, control logic 820 and VPLMN/slice selection logic 822, can include instructions that, when executed, cause processor(s) 802 to perform operations, which can include, but not be limited to, providing overall control operations of user equipment 800; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one implementation, control logic 820 and VPLMN/slice selection logic 822 can include instructions that, when executed, cause processor(s) 802 to perform operations including requesting, by the user equipment that is roaming among a plurality of visited mobile networks, registration for a network connection associated with a slice type; obtaining, by the user equipment, a priority for each of the plurality of visited mobile networks and an indication of one or more slice types provided by each of the plurality of visited mobile networks; selecting, by the user equipment, a highest priority visited mobile network of the plurality of visited mobile networks that provides the slice type; and establishing, by the user equipment, the network connection with the highest priority visited mobile network of the plurality of visited mobile networks that provides the slice type.

The programs described herein (e.g., control logic 720 of computing device 700 and/or control logic 820 and VPLMN/slice selection logic 822 of user equipment 800) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) (e.g., memory element(s) 704 of computing device 700 and memory element(s) 804 of user equipment 800) and/or storage (e.g., storage 706 of computing device 700 and storage 806 of user equipment 800) can store data, software, code, instructions (e.g., processor instructions), logic, parameters, combinations thereof, and/or the like used for operations described herein. This includes memory element(s) 704/804 and/or storage 706/806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include requesting, by a user equipment that is roaming among a plurality of visited mobile networks, registration for a network connection associated with a slice type; obtaining, by the user equipment from a home mobile network for the user equipment, a priority for each of the plurality of visited mobile networks and an indication of one or more slice types provided by each of the plurality of visited mobile networks; selecting, by the user equipment, a highest priority visited mobile network of the plurality of visited mobile networks that provides the slice type; and establishing, by the user equipment, the network connection with the highest priority visited mobile network of the plurality of visited mobile networks that provides the slice type.

In one instance, the obtaining further comprises obtaining the priority for each of the plurality of visited mobile networks and the indication of the one or more slice types provided by each of the plurality of visited mobile networks from a Third Generation Partnership Project (3GPP) Steering of Roaming Application Function (SOR-AF) or a 3GPP Unified Data Management (UDM) entity (e.g., contained in a VPLMN:Slice priority list) of the home mobile network for the user equipment.

In one instance, the obtaining further comprises obtaining the priority for each of the plurality of visited mobile networks from a Third Generation Partnership Project (3GPP) Steering of Roaming Application Function (SOR-AF) or a 3GPP Unified Data Management (UDM) entity (e.g., contained in a roaming priority list) of the home mobile network for the user equipment; and obtaining the indication of the one or more slice types provided by each of the plurality of visited mobile networks from a Third Generation Partnership Project (3GPP) Policy Control Function (PCF) (e.g., contained in a VPLMN:Slice mapping) of the home mobile network for the user equipment. In such an instance, the selecting further comprises correlating the priority for each of the plurality of visited mobile networks obtained from the 3GPP SOR-AF or the 3GPP UDM entity with the indication of the one or more slice types provided by each of the plurality of visited mobile networks obtained from the 3GPP PCF to select the highest priority visited mobile network of the plurality that provides the slice type.

In one instance, the obtaining is performed by the user equipment via a first visited mobile network and the highest priority visited mobile network that provides the slice type is a second visited mobile network that is different than the first visited mobile network. In such an instance, the method may further include performing, by the user equipment, de-registration with the first visited mobile network and performing a registration procedure with the second visited mobile network to establish the network connection.

In one instance, the obtaining is performed by the user equipment via a first visited mobile network and the highest priority mobile network that provides the slice type is the first visited mobile network in which the network connection is established with the first visited mobile network. In one instance, the priority for each of the plurality of visited mobile networks for the prioritized list is configured based on a time factor such that identifying the highest priority visited mobile network is based on a time at which the network connection is established by the user equipment.

In summary, techniques herein may facilitate visited network selection by a user equipment based on slice considerations. In at least one embodiment, the techniques can include configuring supported slice type(s) (S-NSSAI(s)) in combination with a prioritized list of roaming partners within an SOR-AF (e.g., a VPLMN:Slice priority list, as discussed for embodiments herein), in which the prioritized list can be obtained by a user equipment to facilitate visited network selection by the UE based on slice considerations and roaming priority. Thus, a UE can be notified regarding supported S-NSSAI(s) for prioritized VPLMNs using SOR records in at least one embodiment.

In at least one embodiment, the techniques can also include provisioning a PCF with a VPLMN to slice type (S-NSSAI) mapping for an AM policy (e.g., a VPLMN:Slice mapping, as discussed for embodiments herein) and notifying a UE of the VPLMN to supported slice type mapping as part of an AM policy. Using SOR records identifying a priority of each of the VPLMNs also obtained by the UE, along with the VPLMN to supported slice type mapping, techniques herein may facilitate visited network selection by the UE based on slice considerations and roaming priority.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of and' one or more of can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

requesting, by a user equipment that is roaming among a plurality of visited mobile networks, registration with a first visited mobile network of the plurality of visited mobile networks for a network connection associated with a slice type;

obtaining, by the user equipment from a home mobile network for the user equipment via the first visited mobile network, a priority for each of the plurality of visited mobile networks and an indication of one or more slice types provided by each of the plurality of visited mobile networks, wherein the obtaining comprises obtaining the priority for each of the plurality of visited mobile networks from a 3GPP Unified Data Management (UDM) entity of the home mobile network for the user equipment and obtaining the indication of the one or more slice types provided by each of the plurality of visited mobile networks from a 3GPP Policy Control Function (PCF) of the home mobile network for the user equipment;

selecting, by the user equipment, based on the obtained priority for each of the plurality of visited mobile networks and the obtained indication of the one or more slice types provided by each of the plurality of visited mobile networks, a highest priority visited mobile network of the plurality of visited mobile networks that provides the slice type, wherein the selecting includes correlating the priority for each of the plurality of visited mobile networks obtained from the 3GPP UDM entity with the indication of the one or more slice types provided by each of the plurality of visited mobile networks obtained from the 3GPP PCF to select the highest priority visited mobile network of the plurality that provides the slice type; and establishing, by the user equipment, the network connection with the highest priority visited mobile network of the plurality of visited mobile networks that provides the slice type.

2. The method of claim 1, wherein the highest priority visited mobile network that provides the slice type is a second visited mobile network that is different than the first visited mobile network.

3. The method of claim 2, further comprising:

performing, by the user equipment, de-registration with the first visited mobile network; and performing a registration procedure with the second visited mobile network to establish the network connection.

4. The method of claim 1, wherein the highest priority mobile network that provides the slice type is the first visited mobile network, wherein the network connection is established with the first visited mobile network.

5. The method of claim 1, wherein the priority for each of the plurality of visited mobile networks is associated with a time factor.

6. The method of claim 5, wherein the time factor indicates a time of day or one or more time of day ranges.

7. The method of claim 6, wherein the selecting is based further on a time at which the user requests the registration for the network connection.

8. One or more non-transitory computer readable storage media encoded with instructions that, when executed by a processor, cause the processor to perform operations, comprising:

requesting, by a user equipment that is roaming among a plurality of visited mobile networks, registration with a first visited mobile network of the plurality of visited mobile networks for a network connection associated with a slice type;

obtaining, by the user equipment from a home mobile network for the user equipment via the first visited mobile network, a priority for each of the plurality of visited mobile networks and an indication of one or more slice types provided by each of the plurality of visited mobile networks, wherein the obtaining comprises obtaining the priority for each of the plurality of visited mobile networks from a 3GPP Unified Data Management (UDM) entity of the home mobile network for the user equipment and obtaining the indication of the one or more slice types provided by each of the plurality of visited mobile networks from a 3GPP Policy Control Function (PCF) of the home mobile network for the user equipment;

selecting, by the user equipment, based on the obtained priority for each of the plurality of visited mobile networks and the obtained indication of the one or more slice types provided by each of the plurality of visited mobile networks, a highest priority visited mobile network of the plurality of visited mobile networks that provides the slice type, wherein the selecting includes correlating the priority for each of the plurality of visited mobile networks obtained from the 3GPP UDM entity with the indication of the one or more slice types provided by each of the plurality of visited mobile networks obtained from the 3GPP PCF to select the highest priority visited mobile network of the plurality that provides the slice type; and establishing, by the user equipment, the network connection with the highest priority visited mobile network of the plurality of visited mobile networks that provides the slice type.

9. The media of claim 8, wherein the highest priority visited mobile network that provides the slice type is a second visited mobile network that is different than the first visited mobile network.

10. The media of claim 9, further comprising instructions that, when executed by the processor, cause the processor to perform further operations, comprising:

performing, by the user equipment, de-registration with the first visited mobile network; and performing a registration procedure with the second visited mobile network to establish the network connection.

11. The media of claim 8, wherein the highest priority mobile network that provides the slice type is the first visited mobile network, wherein the network connection is established with the first visited mobile network.

12. The media of claim 8, wherein the priority for each of the plurality of visited mobile networks is associated with a time factor and the selecting is based further on a time at which the user requests the registration for the network connection.

13. The media of claim 12, wherein the time factor indicates a time of day or one or more time of day ranges.

14. A user equipment comprising:

at least one memory element for storing data; and at least one processor for executing instructions associated with the data, wherein executing the instructions causes the user equipment to perform operations, comprising:

requesting, by the user equipment that is roaming among a plurality of visited mobile networks, registration with a first visited mobile network of the plurality of visited mobile networks for a network connection associated with a slice type;

obtaining, by the user equipment from a home mobile network for the user equipment via the first mobile network, a priority for each of the plurality of visited mobile networks and an indication of one or more slice types provided by each of the plurality of visited mobile networks, wherein the obtaining comprises obtaining the priority for each of the plurality of visited mobile networks from a 3GPP Unified Data Management (UDM) entity of the home mobile network for the user equipment and obtaining the indication of the one or more slice types provided by each of the plurality of visited mobile networks from a 3GPP Policy Control Function (PCF) of the home mobile network for the user equipment;

selecting, by the user equipment, based on the obtained priority for each of the plurality of visited mobile networks and the obtained indication of the one or more slice types provided by each of the plurality of visited mobile networks, a highest priority visited mobile network of the plurality of visited mobile networks that provides the slice type, wherein the selecting includes correlating the priority for each of the plurality of visited mobile networks obtained from the 3GPP UDM entity with the indication of the one or more slice types provided by each of the plurality of visited mobile networks obtained from the 3GPP PCF to select the highest priority visited mobile network of the plurality that provides the slice type; and establishing, by the user equipment, the network connection with the highest priority visited mobile network of the plurality of visited mobile networks that provides the slice type.

15. The user equipment of claim 14, wherein the highest priority visited mobile network that provides the slice type is a second visited mobile network that is different than the first visited mobile network.

16. The user equipment of claim 15, wherein executing the instructions causes the user equipment to perform further operations, comprising:

performing, by the user equipment, de-registration with the first visited mobile network; and performing a registration procedure with the second visited mobile network to establish the network connection.

17. The user equipment of claim 14, wherein the highest priority mobile network that provides the slice type is the first visited mobile network, wherein the network connection is established with the first visited mobile network.

18. The user equipment of claim 14, wherein the priority for each of the plurality of visited mobile networks is associated with a time factor.

19. The user equipment of claim 18, wherein the time factor indicates a time of day or one or more time of day ranges.

20. The user equipment of claim 19, where the selecting is based further on a time at which the user requests the registration for the network connection.

\* \* \* \* \*